US012561020B2

(12) United States Patent
Wang et al.

(10) Patent No.: US 12,561,020 B2
(45) Date of Patent: Feb. 24, 2026

(54) TOUCH DISPLAY PANEL AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Wei Wang, Beijing (CN); Juntao Chen, Beijing (CN); Ping Wen, Beijing (CN); Yi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/713,686

(22) PCT Filed: Aug. 29, 2022

(86) PCT No.: PCT/CN2022/115535
§ 371 (c)(1),
(2) Date: May 27, 2024

(87) PCT Pub. No.: WO2024/044894
PCT Pub. Date: Mar. 7, 2024

(65) Prior Publication Data
US 2025/0021184 A1    Jan. 16, 2025

(51) Int. Cl.
*G06F 3/041* (2006.01)
(52) U.S. Cl.
CPC .................... *G06F 3/04164* (2019.05); *G06F 2203/04107* (2013.01)

(58) Field of Classification Search
None
See application file for complete search history.

(56) References Cited

U.S. PATENT DOCUMENTS

2008/0137016 A1* 6/2008 Kim ..................... G02F 1/13452
326/82
2016/0147325 A1* 5/2016 Tai ....................... G06F 3/04164
345/173
(Continued)

FOREIGN PATENT DOCUMENTS

CN 105467643 A 4/2016
CN 205193764 U 4/2016
(Continued)

OTHER PUBLICATIONS

International Search Report of PCT application No. PCT/CN2022/ 115535 dated May 15, 2023.
(Continued)

*Primary Examiner* — Krishna P Neupane

(57) ABSTRACT

A touch display panel is provided with a display area and a peripheral area. The peripheral area includes a bending area and a bonding area away from the display area. The touch display panel includes: a driving backplane including peripheral driving lines at least partially located in the peripheral area, at least part of the peripheral driving lines passing through the bending area, and extending into the bonding area; light-emitting devices arranged at one side of the driving backplane and located in the display area, and each including a first electrode, a light-emitting layer, and a second electrode; a touch layer arranged on a side of light-emitting device layer away from the driving backplane and including peripheral touch lines; and a shielding layers arranged between the touch layer and the driving backplane,
(Continued)

and at least partially located between the boundary of the second electrode and the bending area.

20 Claims, 7 Drawing Sheets

(56)                    References Cited

U.S. PATENT DOCUMENTS

| | | | | |
|---|---|---|---|---|
| 2020/0089351 A1* | 3/2020 | Jeong | ................... | G06F 3/04164 |
| 2020/0091252 A1* | 3/2020 | Bang | ...................... | H10K 59/40 |
| 2020/0388665 A1 | 12/2020 | Jung et al. | | |
| 2022/0262866 A1 | 8/2022 | Kim et al. | | |

FOREIGN PATENT DOCUMENTS

| | | | |
|---|---|---|---|
| CN | 112711349 | A | 4/2021 |
| CN | 112768495 | A | 5/2021 |
| CN | 113110766 | A | 7/2021 |
| EP | 3624197 | A1 | 3/2020 |
| EP | 3786768 | A1 | 3/2021 |

OTHER PUBLICATIONS

Written Opinion of PCT application No. PCT/CN2022/115535 dated May 15, 2023.
Extended European Search Report of application No. 22956730.0 dated Apr. 22, 2025.

* cited by examiner

TMB

WTL1 $\left\{\begin{array}{l} \text{WTL11} \\ \text{WTL12} \\ \text{WTL13} \end{array}\right.$

TOUCH DISPLAY PANEL AND DISPLAY DEVICE

CROSS REFERENCE TO RELATED APPLICATION

The present application is a U.S. National Stage of International Application No. PCT/CN2022/115535, filed on Aug. 29, 2022, the content of which is incorporated by reference herein in its entirety.

TECHNICAL FIELD

The present disclosure relates to the field of touch technology, and specifically to a touch display panel and a display device.

BACKGROUND

Touch display panels are an important part of terminal device such as mobile phones and smart watches. While displaying images, they can also realize human-computer interaction through touch operations. However, the touch accuracy of existing touch display panels still needs to be improved.

It should be noted that the information disclosed in the above background section is only used to enhance understanding of the background of the present disclosure, and therefore may include information that does not constitute prior art known to those of ordinary skill in the art.

SUMMARY

The present disclosure provides a touch display panel and a display device.

According to an aspect of the present disclosure, there is provided a touch display panel, having a display area and a peripheral area located outside the display area, where the peripheral area includes a bending area and a bonding area away from the display area, and the bonding area is located on a side of the bending area away from the display area;

wherein the touch display panel includes:

a driving backplane including peripheral driving lines at least partially located in the peripheral area, where at least part of the peripheral driving lines passes through the bending area and extends into the bonding area;

a plurality of light-emitting devices provided on a side of the driving backplane and located in the display area, where each of light-emitting devices includes a first electrode, a light-emitting layer and a second electrode sequentially stacked in a direction away from the driving backplane, and a boundary of the second electrode extends to the peripheral area and is located on a side of the bending area away from the bonding area;

a touch layer provided on a side of a light-emitting device layer away from the driving backplane, and including peripheral touch lines located in the peripheral area, where the peripheral touch lines pass through the bending area, and extend into the bonding area, and at least part of the peripheral touch lines and at least part of the peripheral driving lines have an overlapping area; and a shielding layer provided between the touch layer and the driving backplane, and at least partially located between the boundary of the second electrode and the bending area, where the shielding layer at least partially covers the overlapping area, and the shielding layer receives a same signal as the first electrode or the second electrode.

According to an aspect of the present disclosure, there is provided a touch display panel, having a display area and a peripheral area located outside the display area, where the peripheral area includes a bending area and a bonding area away from the display area, and the bonding area is located on a side of the bending area away from the display area;

where the touch display panel includes:

a touch layer including touch electrodes located in the display area and peripheral touch lines located in the peripheral area, where the peripheral touch lines pass through the bending area and extend into the bonding area;

where a distance between a peripheral touch line closest to the touch electrodes and a touch electrode closest to the peripheral touch lines is 20 times to 22 times of a distance between any two adjacent peripheral touch lines.

According to an aspect of the present disclosure, there is provided a touch display panel, having a display area and a peripheral area located outside the display area, where the peripheral area includes a bending area and a bonding area away from the display area, and the bonding area is located on a side of the bending area away from the display area;

where the touch display panel includes:

a driving backplane, including peripheral driving lines at least partially located in the peripheral area, where at least part of the peripheral driving lines passes through the bending area and extends into the bonding area;

a plurality of light-emitting devices provided on a side of the driving backplane and located in the display area, where each of the light-emitting devices includes a first electrode, a light-emitting layer and a second electrode sequentially stacked in a direction away from the driving backplane; a boundary of the second electrode extends to the peripheral area and is located on a side of the bending area away from the bonding area;

a touch layer provided on a side of a light-emitting device layer away from the driving backplane, and including peripheral touch lines located in the peripheral area, where the peripheral touch lines pass through the bending area, extend into the bonding area, and at least part of the peripheral touch lines overlaps with at least part of the peripheral driving lines;

at least part of the peripheral touch lines and at least part of the peripheral driving lines intersect between the bending area and the bonding area, and a width of an area of the peripheral touch lines that intersects with the peripheral driving lines is smaller than a width of an area of the peripheral touch lines that does not intersect with the peripheral driving lines.

According to an aspect of the present disclosure, there is provided a display device, including the touch display panel according to any one of the above-mentioned items.

It should be understood that the above general description and the detailed description that follows are exemplary and explanatory only and do not limit the present disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure. Obviously, the drawings in the following description are only some embodiments of the present disclosure. For those of ordinary skill in the art, other drawings can be obtained based on these drawings without exerting creative efforts.

DETAILED DESCRIPTION

Figure 1:
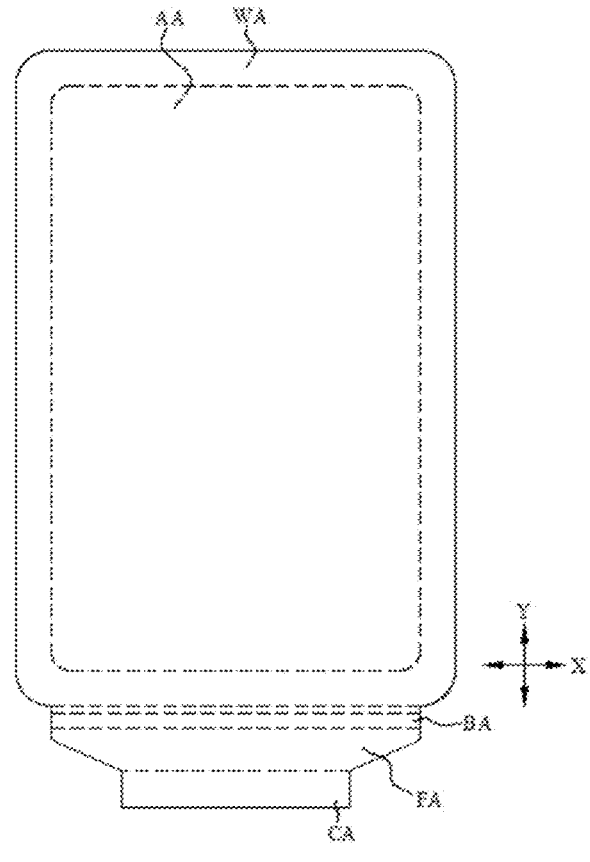
FIG. 1 is a top view of a touch display panel according to an embodiment of the present disclosure.

Embodiments will now be described more fully with reference to the accompanying drawings. Embodiments may, however, be embodied in various forms and should not be construed as limited to the embodiments set forth herein; rather, these embodiments are provided so that the present disclosure will be thorough and complete, and will fully convey the concepts of the embodiments to those skilled in the art. The same reference numerals in the drawings represent the same or similar structures, and thus their detailed descriptions will be omitted. Furthermore, the drawings are merely schematic illustrations of the present disclosure and are not necessarily drawn to scale.

The terms "a", "an", "the", "said" and "at least one" indicate the presence of one or more elements/components/ etc.; the terms "include" and "have" indicate an open-ended inclusiveness and mean that there may be additional elements/components/etc. in addition to those listed; the terms "first", "second", "third" etc. are only used as a marker, not as quantitative limitations on their objects.

The row direction and the column direction Y herein are only two mutually perpendicular directions. In the drawings of the present disclosure, the row direction may be horizontal and the column direction Y may be vertical. However, it is not limited to this. If the touch display panel is rotated, the actual orientation of the row direction and the column direction Y may change.

The "overlap" of feature A and feature B herein means that the orthographic projection of feature A on the substrate and the orthographic projection of feature B on the substrate at least partially overlap.

Embodiments of the present disclosure provide a touch display panel. As shown in FIG. 1, the touch display panel has a display area AA and a peripheral area WA located outside the display area AA. The peripheral area WA can be a continuous or interrupted annular area surrounding the display area AA, or it may also be a semi-enclosed area, and the shape of the peripheral area WA is not particularly limited. The peripheral area WA may include a lead-out area FA that protrudes in a direction away from the display area AA along the column direction Y. The lead-out area FA may include a bending area BA and a bonding area CA distributed along the column direction Y. The bonding area CA is located on a side of the bending area BA away from the display area AA. By bending the bending area BA, the lead-out area FA can be bent to the backlight side of the touch display panel, that is, the side opposite to the light emitting direction.

In addition, the bonding area CA has at least one driver chip and a plurality of pins connected to the driver chip. It can be connected to a flexible circuit board through the pins of the bonding area CA, and the flexible circuit board can be bonded to a control circuit board, thereby realizing the connection between the touch display panel and the control circuit board, so as to control the touch display panel to display images and realize the touch function through the control circuit board. Of course, the bonding area CA may not be provided with a driver chip, but the driver chip may be provided on a flexible circuit board or a control circuit board and connected to the pins of the bonding area CA to implement display and touch functions.

As shown in FIGS. 2 to 8, the touch display panel of the present disclosure may include a driving backplane BP, a light emitting device LD, a touch layer TSP and a shielding layer ES, where:

The driving backplane BP may include peripheral driving lines WBL located at least partially in the peripheral area WA, and at least part of the peripheral driving lines WBL passes through the bending area BA and extends into the bonding area CA.

The light-emitting device LD is provided on one side of the driving backplane BP, and includes light-emitting devices located in the display area AA. The light-emitting devices LD include a first electrode ANO, a light-emitting layer EL and a second electrode CAT sequentially stacked in a direction away from the driving backplane BP. The individual light-emitting devices LD share the second electrode CAT, and the boundary of the second electrode CAT extends to the peripheral area WA and is located on a side of the bending area BA away from the bonding area CA.

The touch layer TSP can be located on a side of the light-emitting device LD layer away from the driving backplane BP, and includes peripheral touch lines WTL located in the peripheral area WA. The peripheral touch lines WTL pass through the bending area BA and extend to the bonding area CA, and at least part of the peripheral touch lines WTL and at least part of the peripheral driving lines WBL have an overlapping area. The shielding layer ES is provided between the touch layer TSP and the driving backplane BP, and at least partially located between the boundary of the second electrode CAT and the bending area BA. The shielding layer ES at least partially covers the overlapping area, and the shielding layer ES partially overlaps the second electrode CAT. The shielding layer ES receives the same signal as the first electrode ANO or the second electrode CAT.

In the touch display panel of the present disclosure, a shielding layer ES is provided between the touch layer TSP and the driving backplane BP. The shielding layer ES partially overlaps the second electrode CAT, and is partially located between the boundary of the second electrode CAT and the bending area BA. The shielding layer ES can receive the same signal as the first electrode ANO or the second electrode CAT, so that the peripheral touch line WTL and the peripheral driving line WBL can be isolated through the shielding layer ES to prevent the signal of the peripheral driving lines WBL interfere with the signal of the peripheral touch lines WTL, thereby ensuring the normal realization of the touch function and improving the accuracy of the touch.

Figure 3:
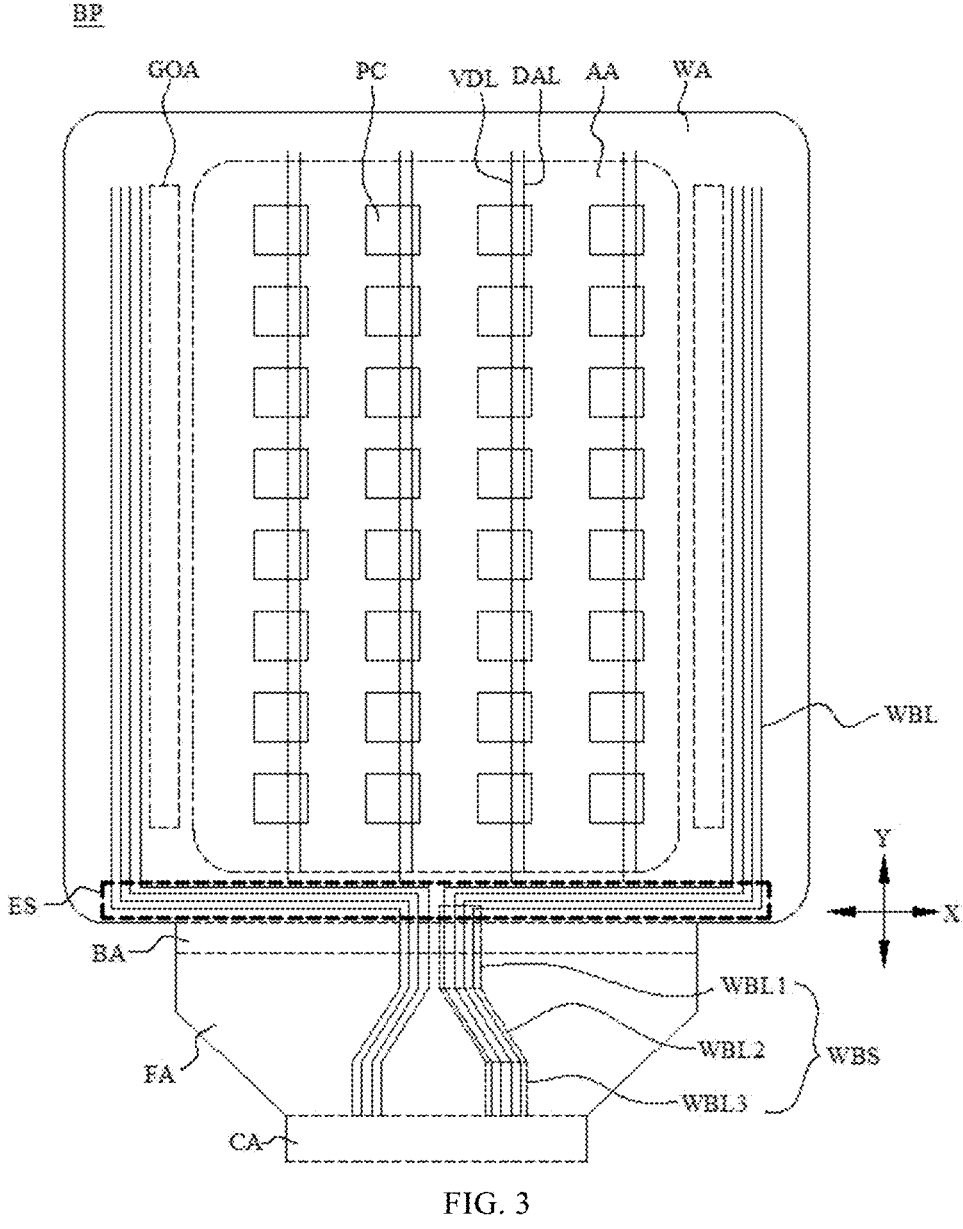
FIG. 3 is a schematic diagram of a driving backplane in a touch display panel according to an embodiment of the present disclosure.

The touch display panel of the present disclosure is described in detail below:

The following is a detailed description of the driving backplane BP:

As shown in FIG. 3, the driving backplane BP may include a driving circuit for driving respective light-emitting devices LD to emit light independently. The driving circuit may include a pixel circuit PC and a peripheral circuit. There are a plurality of pixel circuits PC, and at least part of the pixel circuits PC may be provided in the display area AA. Of course, a part of the pixel circuit PC may be located in the peripheral area WA.

Each pixel circuit PC can include a plurality of transistors and storage capacitors. The channels of the individual transistors can be set on the same layer, and they can all use semiconductor materials such as polysilicon. The pixel circuit PC can be a pixel circuit PC such as 3T1C, 7T1C, etc., and nTmC means that a pixel circuit PC includes n transistors (indicated by the letter "T") and m capacitors (indicated by the letter "C"). There can be a plurality of pixel circuits PC, and the array distribution is in multiple rows and columns. One pixel circuit PC can be connected to one light-emitting device LD. Of course, there can also be a situation where one pixel circuit PC is connected to multiple light-emitting devices LD. Only the one-to-one connection between the pixel circuit PC and the light-emitting device LD is described as an example herein.

Figure 4:
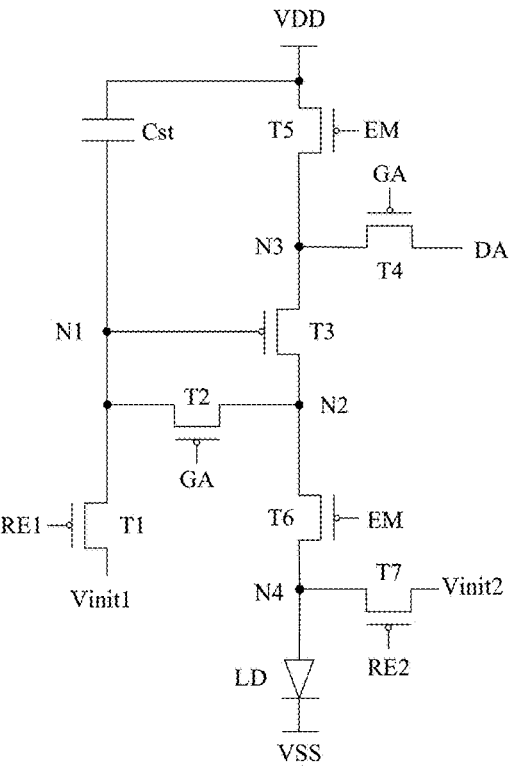
FIG. 4 is a schematic diagram of a pixel circuit in a touch display panel according to an embodiment of the present disclosure.

In some embodiments of the present disclosure, as shown in FIG. 4, the pixel circuit PC may be a 7T1C structure, which may have 7 transistors and 1 capacitor, namely a first reset transistor T1, a compensation transistor T2, a driving transistor T3, a writing transistor T4, a first light-emitting control transistor T5, a second light-emitting control transistor T6, a second reset transistor T7 and a storage capacitor Cst.

At the same time, in order to facilitate signal transmission to the pixel circuit PC, the driving backplane BP may also include a gate line, a reset signal line, a data line DAL, a power supply line VDL, etc., where there may be a plurality of gate lines and a plurality of reset signal lines, and they all pass through the display area AA along the row direction X and extend into the peripheral area WA, and one pixel circuit PC connects to a plurality of gate lines and a plurality of reset signal lines. Gate lines connected to the same pixel circuit PC may include a first reset control line, a second reset control line, a scanning line and a light emitting control line. Reset signal lines connected to the same pixel circuit PC may include a first reset signal line and a second reset signal line.

Both the data line DAL and the power supply line VDL pass through the display area AA along the column direction Y and extend into the peripheral area WA. One column of pixel circuits PC is at least connected to a data line DAL and a power supply line VDL.

The first electrode of the first reset transistor T1 is connected to the first reset signal line VIL1 for receiving the reset signal Vinit1, and the second electrode of the first reset transistor T1 is connected to the gate electrode of the driving transistor T3 and the first plate of the storage capacitor Cst.

The first electrode of the compensation transistor T2 is connected to the second electrode of the driving transistor T3, and the second electrode of the compensation transistor T2 is connected to the gate electrode of the driving transistor T3.

The first electrode of the writing transistor T4 is connected to the data line DAL for receiving the data signal DA, and the second electrode of the writing transistor T4 is connected to the first electrode of the driving transistor T3.

The first electrode of the first light-emitting control transistor T5 and the second plate of the storage capacitor Cst are connected to the power supply line VDL for receiving the first power signal VDD, and the second electrode of the first light-emitting control transistor T5 is connected to the first electrode of the driving transistor T3.

The first electrode of the second light emitting control transistor T6 is connected to the second electrode of the driving transistor T3, and the second electrode of the second light emitting control transistor T6 is connected to the first electrode ANO of a light emitting device LD.

The first electrode of the second reset transistor T7 is connected to the second reset signal line VIL2 for receiving the second reset signal Vinit2, and the second electrode of the second reset transistor T7 is connected to the second electrode of the second light emitting control transistor T6. The second electrode CAT of the light emitting device LD may receive the second power signal VSS.

At the same time, in order to control on and off of each transistor, the gate electrode of the first reset transistor T1 is connected to the first reset control line for inputting the first reset control signal RE1, and the gate electrode of the second reset transistor T7 is connected to the second reset control line for inputting the second reset control signal RE2. The gate electrodes of the compensation transistor T2 and the writing transistor T4 are connected to the scan line for inputting the scan signal GA, and the gate electrodes of the first light-emitting control transistor T5 and the second light-emitting control transistor T6 are connected to the light-emitting control line for inputting the light-emitting control signal EM.

Taking the following as an example, each transistor of the pixel circuit PC is a P-type low-temperature polysilicon transistor to explain its working principle:

In the reset phase: the first reset control signal RE1 is a low-level signal. The first reset transistor T1 is turned on. The gate electrode of the driving transistor T3 and the first plate of the storage capacitor Cst are written with the reset signal Vinit1, and the N1 node is initialized to eliminate the influence of the data of the previous frame of image.

In the writing stage: when the scanning signal GA is a low-level signal, the writing transistor T4 and the compensation transistor T2 can be turned on, and a light-transmitting hole DA can be written to the gate electrode of the driving transistor T3 and the first plate Cst1 of the storage capacitor Cst. That is, the light-transmitting hole DA is written to the N1 node through the N3 node and the N2 node until the potential reaches Vdata+Vth. Vdata is the voltage of the light-transmitting hole DA, and Vth is the threshold voltage of the driving transistor T3. The scanning signal GA for the writing transistor T4 and the compensation transistor T2 may be the same signal. At the same time, the second reset control signal RE2 is a low-level signal, causing the second reset transistor T7 to be turned on. The second electrode CAT of the light-emitting device LD and the second electrode of the second light-emitting control transistor T6 are written with the second reset signal Vinit2. The N4 node is reset to be initialized, thereby further eliminating the influence of the data of the previous frame of image.

In the light-emitting stage: the light-emitting control signal EM is a low-level signal. The first light-emitting control transistor T5 and the second light-emitting control transistor T6 are turned on. The driving transistor T3 is turned on in response to the voltage Vdata+Vth stored in the storage capacitor Cst and the first power signal VDD. At this time, the light-emitting device LD emits light.

In addition, transistors can be classified into N-type and P-type transistors according to their characteristics. In the embodiment of the present disclosure, the transistors all adopt P-type transistors as an example for explanation. Based on the description and teaching of this implementation in the present disclosure, those of ordinary skill in the art can easily think of using N-type transistors for at least some of the transistors in the structure of the pixel circuit PC in the embodiment of the present disclosure, without paying inventive labor, that is, using implementation of N-type transistors or combinations of N-type transistors and P-type transistors. Therefore, these implementations are also within the protection scope of the embodiments of the present disclosure.

On the one hand, the peripheral circuit can be connected to the light-emitting device LD through the pixel circuit PC and apply the first power signal to the first electrode ANO of the light-emitting device LD. On the other hand, the peripheral circuit can also be connected to the second electrode CAT of the light-emitting device LD, and apply the second power signal VSS to the second electrode CAT. The current passing through the light-emitting device LD can be controlled by controlling the pixel circuit PC, thereby controlling the brightness of the light-emitting device LD. The peripheral circuit may include a peripheral driving circuit GOA, which may include a gate driving circuit, a light emitting control circuit, etc., and of course may also include other circuits. The specific structure of the peripheral circuit is not specifically limited here.

As shown in FIG. 3, the driving backplane BP may also include a bus located in the peripheral area WA. The bus may pass from the peripheral area WA through the bending area BA, extend to the lead-out area FA, and extend to the bonding area CA, or be located within the lead-out area FA. The bus may include a reset signal bus, a first power bus and a second power bus that may be spaced apart in a direction away from the display area AA. The first reset signal line and the second reset signal line are both connected to the reset signal bus for receiving the first reset signal and the second reset signal. The power supply line VDL can be connected to the first power bus for receiving the first power signal VDD, and the second electrode CAT of each light-emitting device LD can be connected to the second power bus for receiving the second power signal VSS.

In some embodiments of the present disclosure, the gate driving circuit may include a plurality of cascaded gate shift register units, which may provide reset control signals and scan signals to the multi-row pixel circuit PC, thereby controlling the transistors to turn on in sequence. The scan line, the first reset control line and the second reset control line described above are all connected to the gate driving circuit.

For example, a gate shift register unit may include a plurality of transistors and capacitors, which may be 8T2C, 10T2C or 12T2C, etc., and nTmC indicates that a pixel circuit PC includes n transistors (indicated by the letter "T") and m capacitors (indicated by the letter "C"), and its specific structure is not specifically limited here.

A plurality of gate shift register units are cascaded. The first electrode of the input transistor in the first-stage gate shift register unit is connected to the input terminal. The input terminal is configured to receive the trigger signal as the input signal, while the input terminals of the other stages of the gate shift register units are electrically connected to the output terminals of the upper-stage gate shift register units to receive the output signals output from the upper-stage gate shift register units as input signals, thereby realizing shift output for progressive scanning of the pixel circuit PC in the display area AA.

In addition, as shown in FIG. 3, in order to facilitate the control of the gate shift register unit, the driving backplane BP can also include peripheral driving lines WBL located within the peripheral area WA. The peripheral driving lines WBL can pass through the bending area BA and extend to the lead-out area FA and extend to the bonding area CA, and can be connected to the driver chip in order to receive signals.

The peripheral driving lines WBL may include a driving power supply line, a trigger signal line, a clock signal line, etc. connected to the gate shift register unit. For example, the driving power supply line includes a first driving power line and a second driving power line for providing power to the gate shift register unit; and a trigger signal line for providing the above-mentioned trigger signal. The clock signal line may include a first clock signal line and a second clock signal line for controlling the turn-on timing of at least part of the transistors. The structure and specific working principle of the gate driving circuit are not particularly limited here.

The light-emitting control circuit may include a plurality of light-emitting shift register units cascaded along the column direction Y. The structure and working principle of the light-emitting shift register unit are similar to the gate shift register unit, which can control the light-emitting control transistors of each row of pixel circuits PC to turn on and off in sequence. For example, the light-emitting shift register unit may be connected to the light-emitting control line and output the light-emitting control signal EM to the light-emitting control line. In some embodiments of the present disclosure, the light-emitting shift register unit may be connected to the light-emitting control line to which two rows of pixel circuits PC are connected. Correspondingly, the light-emitting shift register unit can also be connected to a plurality of peripheral driving lines WBL. These peripheral driving lines WBL can include a driving power supply line, a trigger signal line, a clock signal line, etc., and their connection relationships will not be described in detail here.

Of course, in some embodiments of the present disclosure, the pixel circuit PC may not include a light emitting control transistor, and accordingly, the peripheral circuit may not include a light emitting control circuit.

Figure 2:
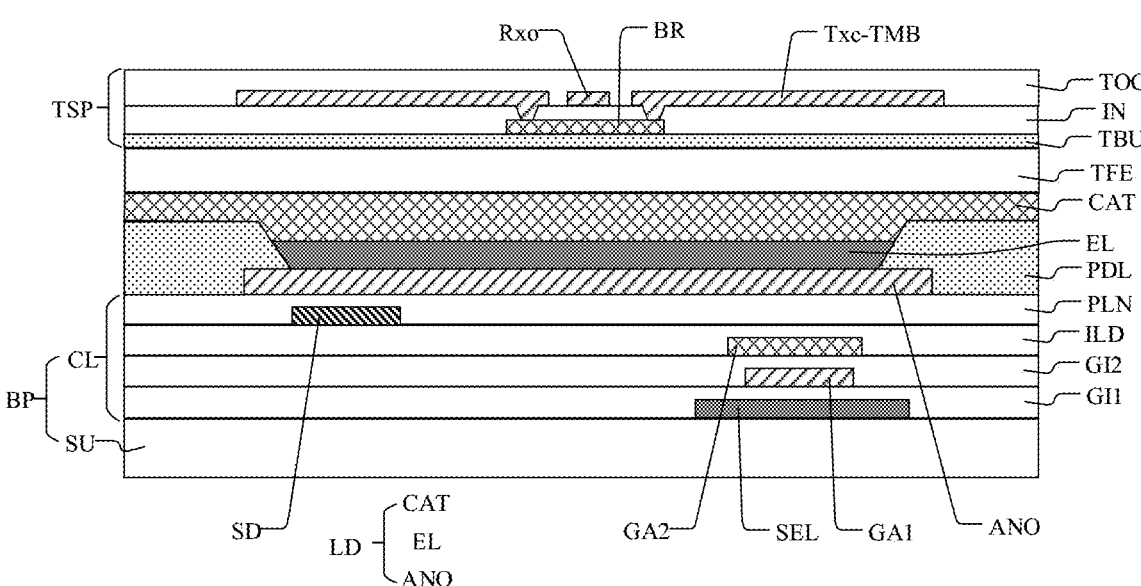
FIG. 2 is a partial cross-sectional view of a display area of a touch display panel according to an embodiment of the present disclosure.

As shown in FIG. 2, the driving backplane BP may include a substrate SU, a circuit layer CL and a planarization layer PLN stacked on one side of the substrate SU, where:

The substrate SU can be a substrate base for the driving backplane BP, which can carry the circuit layer CL. The substrate SU can be a hard or flexible structure, and it can be a single-layer or multi-layer structure, which is not specifically limited here.

The circuit layer CL may include the above-mentioned driving circuit. The transistors and capacitors of the pixel circuit PC and the peripheral circuit, as well as the wiring connecting the pixel circuit PC and the peripheral circuit, are all located in the circuit layer C. Taking the transistors being top-gate low-temperature polysilicon transistors as an example, the circuit layer CL may include a semiconductor layer SEL, a first gate insulating layer GI1, a first gate layer GA1, a second gate insulating layer GI2, a second gate layer GA2, a dielectric layer ILD and a source-drain layer SD sequentially stacked in a direction away from the substrate SU, among which:

The semiconductor layer SEL may include channels of the respective transistors and doped regions connected to at least part of the channels. The connection of part of the transistors can be realized through the doped regions. The first gate layer GA1 may include first plates of respective capacitors, a scan line, a first reset control line, a second reset control line, and a light-emitting control line, etc. The second gate layer GAT2 may include a second plate of a storage capacitor, a first reset signal line, a second reset signal line, a reset signal bus, and the like. The source-drain layer SD may include a data line DAL, a power supply line VDL, a power bus, and at least part of the peripheral driving lines WBL such as a trigger signal line, a driving power line, a clock signal line connected to the gate driving circuit.

The planarization layer PLN may cover the circuit layer CL. For example, the planarization layer PLN covers the source-drain layer SD. The material of the planarization layer PLN can be organic materials such as transparent resin, and the surface of the planarization layer PLN facing away from the driving backplane BP is flat so that the light emitting device LD can be disposed thereon.

In addition, the circuit layer CL may also include a passivation layer, which may cover the source-drain layer SD, and the planarization layer PLN may cover the passivation layer.

In other embodiments of the present disclosure, the driving backplane BP may be provided with a first source-drain layer and a second source-drain layer on the side of the dielectric layer ILD away from the substrate SU. The power supply line and the data line may be located on the second source-drain layer. The planarization layer can cover the second source-drain layer.

Figure 11:
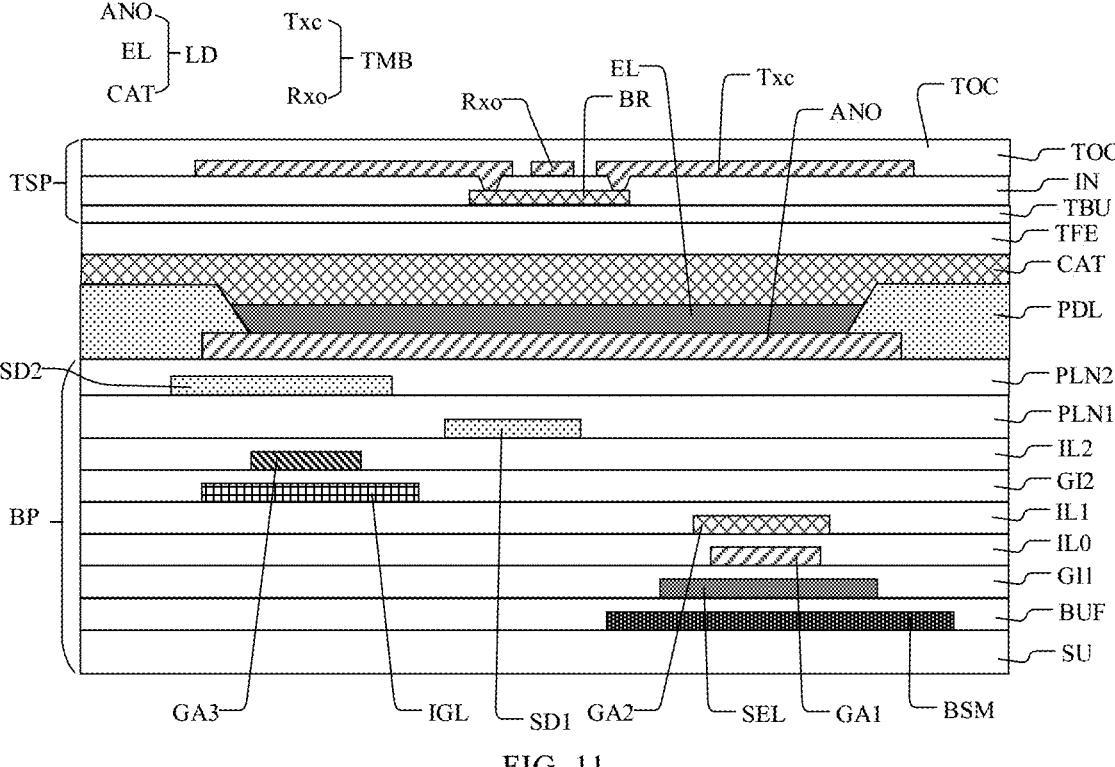
FIG. 11 is a partial cross-sectional view of a display area of a touch display panel according to another embodiment of the present disclosure.

As shown in FIG. 11, in other embodiments of the present disclosure, the above-mentioned 7T1C pixel circuit can also adopt LTPO (LTPS+Oxide) technology. Specifically, the driving transistor T3, the writing transistor T4, the second reset transistor T7, the first light-emitting control transistor T5 and the second light-emitting control transistor T6 can use P-type low-temperature polysilicon transistors. The first reset transistor T1 and the compensation transistor T2 can use N-type metal oxide transistors. Since P-type low-temperature polysilicon transistors have higher carrier mobility, they are conducive to realizing display panels with high resolution, high response speed, high pixel density, and high aperture ratio in order to obtain higher carrier mobility and improve response speed. At the same time, leakage can be reduced through N-type metal oxide transistors. Based on this, the circuit layer CL may include a first semiconductor layer SEL, a first gate insulating layer GI1, a first gate layer GA1, a first insulating layer IL0, a second gate layer GA2, a second insulating layer IL1, a second semiconductor layer IGL, a second gate insulating layer GI2, a third gate layer GA3, a third insulating layer IL2, a first source-drain layer SD1, a first planarization layer PLN1, and a second source-drain layer SD2, where:

The first semiconductor layer SEL may be disposed on one side of the substrate SU and includes channels of the driving transistor T3, the writing transistor T4, the second reset transistor T7, the first light-emitting control transistor T5 and the second light-emitting control transistor T6 in the pixel circuit. The material of the first semiconductor layer SEL may be polysilicon. The first gate insulating layer GI1 may cover the first semiconductor layer SEL.

The first gate layer GA1 may be disposed on a surface of the first gate insulating layer GI1 away from the substrate SU, and includes a first plate of the storage capacitor Cst. The first insulating layer IL0 may cover the first gate layer GA1. The second gate layer GA2 may be disposed on a surface of the first insulating layer IL0 away from the substrate SU, and includes a second plate of the storage capacitor. The second insulating layer IL1 covers the second gate layer GA2, which may be a single-layer structure or a multi-layer structure.

The second semiconductor layer IGL may be disposed on a surface of the second insulating layer IL1 away from the substrate SU, and includes channels of the first reset transistor T1 and the compensation transistor T2. The material of the second semiconductor layer IGL may include semiconductor metal oxides such as indium gallium zinc oxide (IGZO).

The second gate insulating layer GI2 may cover the second semiconductor layer IGL. The third gate layer GA3 may be disposed on a surface of the third gate insulating layer GI2 away from the substrate SU. The third insulating layer IL2 may cover the third gate layer GA3, which may be a single-layer structure or a multi-layer structure.

The first source-drain layer SD1 may be disposed on a surface of the third insulating layer IL2 away from the substrate SU. The first planarization layer PLN1 may be disposed on a side of the first source-drain layer SD1 away from the substrate SU. The second source-drain layer SD2 may be disposed on a surface of the first planarization layer PLN1 away from the substrate SU.

The second planarization layer PLN2 is the planarization layer PLN mentioned above. The second planarization layer PLN2 covers the second source-drain layer SD2, and its material can be an insulating material such as resin. The light emitting device LD may be disposed on a side of the second planarization layer PLN2 away from the substrate SU.

In addition, a light-shielding layer BSM may be provided between the substrate SU and the first semiconductor layer SEL, which may be made of light-shielding metal or other materials, and may be a single-layer structure or a multi-layer structure. At least part of the light-shielding layer BSM may overlap with the channel regions of at least part of the transistors to block light irradiating the transistors to stabilize the electrical characteristics of the transistors. Furthermore, the light-shielding layer BSM can be covered by an insulating buffer layer BUF, and the first semiconductor layer SEL can be provided on the surface of the buffer layer BUF facing away from the substrate SU. The buffer layer BUF may have a single-layer structure or a multi-layer structure, and its material may include insulating materials such as silicon nitride and silicon oxide.

The following is a detailed description of the light-emitting device LD:

As shown in FIG. 2, the light emitting device LD can be disposed on a surface of the planarization layer PLN (the second planarization layer PLN2) away from the substrate SU, and is connected to the pixel circuit PC. There can be a plurality of light-emitting devices LD, and each light-emitting device LD can be connected to a pixel circuit PC, and the same pixel circuit PC can be connected to one or more light-emitting devices LD. The light-emitting device LD may be an OLED (organic light-emitting diode), a QLED (quantum dot light-emitting diode), a Micro LED or a Mini LED, etc., and may include a first electrode ANO, a second electrode CAT and a light emitting layer EL located between the first electrode ANO and the second electrode CAT, where:

The first electrode ANO can be disposed on the surface of the circuit layer CL away from the substrate SU. For example, the first electrode ANO can be disposed on the surface of the planarization layer PLN away from the substrate SU. The light-emitting layer EL can include a hole injection layer, a hole transport layer, a light-emitting material layer, an electron transport layer and an electron injection layer stacked in a direction away from the driving backplane BP. The individual light-emitting devices LD can share the second electrode CAT. That is to say, the second electrode CAT can be a continuous whole-layer structure, and the second electrode CAT can extend to the peripheral area WA and can be connected to the second power bus to receive the second power signal VSS. The first electrode ANO are distributed in an array to ensure that each light-emitting device LD can emit light independently. In addition, in order to limit the light-emitting range of the light-emitting device LD and prevent crosstalk, a pixel definition layer PDL can be provided on the surface where the first electrode ANO is provided, which can have openings exposing the respective first electrodes ANO, and the light-emitting layer EL is stacked with the first electrode ANO within the opening.

The respective light-emitting devices LD can at least share a light-emitting material layer, so that the light-emitting color of each light-emitting device LD is the same. At this time, in order to achieve color display, a color film layer can be provided on the side of the light-emitting device LD away from the substrate SU. The color display is realized through the filter part corresponding to each light-emitting device LD. Of course, the light-emitting material layer of each light-emitting device LD can also be independent, so that the light-emitting device LD can directly emit mono-chromatic light, and the light-emitting colors of different light-emitting devices LD can be different, thereby achieving color display.

In addition, as shown in FIG. 2, the display panel can also include an encapsulation layer TFE, which can cover the light-emitting device LD to protect the light-emitting device LD and prevent external water and oxygen from corroding the light-emitting device LD. For example, the encapsulation layer TFE can be encapsulated by thin film encapsulation, which can include a first inorganic layer, an organic layer and a second inorganic layer. The first inorganic layer covers the light-emitting device LD, and the organic layer can be disposed on a surface of the first inorganic layer away from the driving backplane BP. The boundary of the organic layer is limited to the inside of the boundary of the first inorganic layer. The boundary of the orthographic projection of the organic layer on the driving backplane BP can be located in the peripheral area WA to ensure that the organic layer can cover each light emitting device LD. The second inorganic layer can cover the organic layer and the first inorganic layer that is not covered by the organic layer. The intrusion of water and oxygen can be blocked through the second inorganic layer, and the planarization is achieved through the flexible organic layer.

Figure 5:
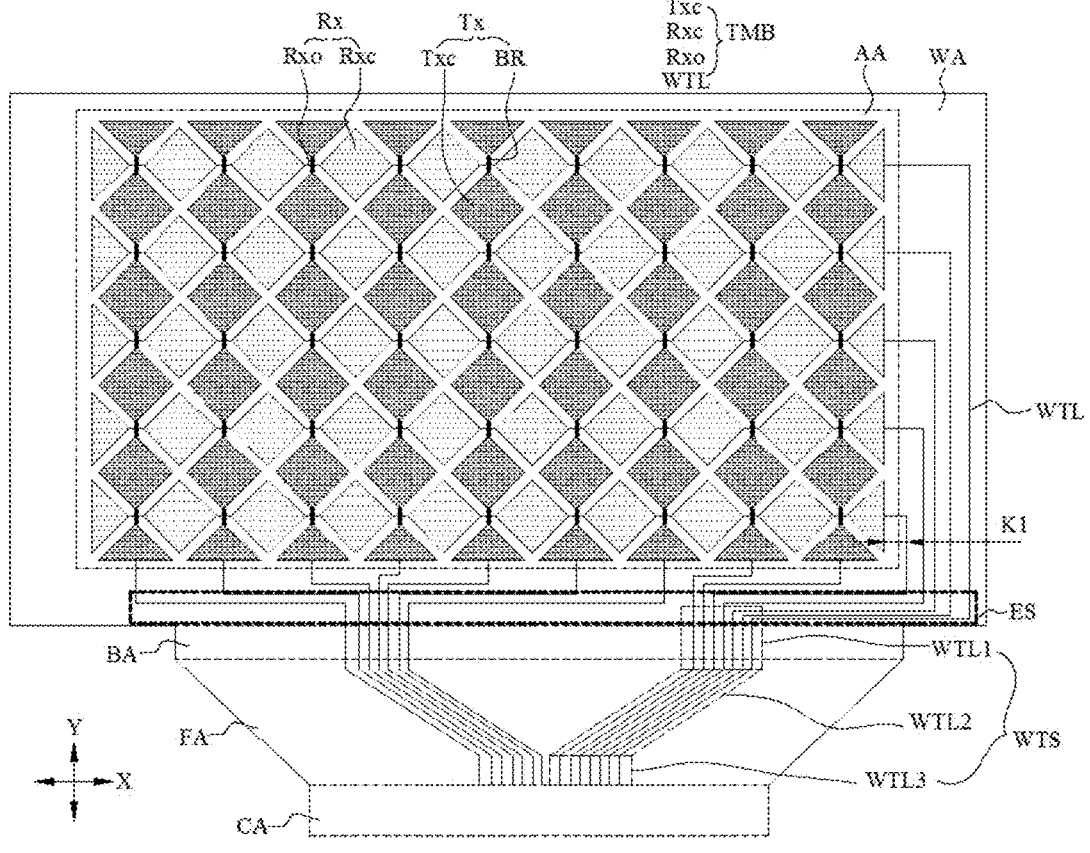
FIG. 5 is a schematic diagram of a touch layer in a touch display panel according to an embodiment of the present disclosure.

The touch layer TSP is described in detail below:

As shown in FIG. 2, the touch layer TSP can be disposed on the side of the encapsulation layer TFE away from the substrate. For example, it can be directly disposed on the surface of the encapsulation layer TFE away from the substrate SU. As shown in FIG. 5, the touch layer TSP may adopt a mutual capacitance structure. In some embodiments of the present disclosure, the touch layer TSP may include a plurality of touch electrodes located in the display area AA, and the touch electrodes may include a first touch electrode Tx and a plurality of second touch electrodes Rx. The first touch electrodes Tx are provided at intervals along the row direction X, and the second touch electrodes Rx are provided at intervals along the column direction Y. Both the first touch electrode Tx and the second touch electrode Rx may include a plurality of electrode blocks connected in series. Any one of the first touch electrodes Tx may include a plurality of first electrode blocks Txc connected in series along the column direction Y, and two adjacent first electrode blocks Txc in the column direction Y are connected in series through a transfer bridge BR. Any one of the second touch electrodes Rx may include a plurality of second electrode blocks Rxc connected in series along the row direction X, and two adjacent second electrode blocks Rxc may be connected in series through a connecting portion Rxo.

The first electrode blocks Txc are distributed in an array and the second electrode blocks Rxc are distributed in an array. At least a part of the first electrode blocks Txc are arranged adjacent to different second electrode blocks Rxc in two different directions intersecting the row direction X and the column direction Y. Accordingly, at least a part of the second electrode blocks Rxc are arranged adjacent to different first electrode blocks Txc in two different directions intersecting the row direction X and the column direction Y.

There is a gap between a first electrode block Txc and a second electrode block Rxc which are adjacent, thereby forming a capacitance. In order to increase the facing area between a first electrode block Txc and a second electrode block Rxc area which are adjacent, the edges of the first electrode block Txc and the second electrode block Rxc can have interdigitated fingers spaced apart along the circumferential direction. In a first electrode block Txc and a second electrode block Rxc which are adjacent, a part of the interdigitated fingers of the first electrode block Txc may be located between a part of the interdigitated fingers of the second electrode block Rxc, but not in contact with each other, so that the part of the interdigitated fingers of the first electrode block Txc and the part of the interdigitated fingers of the second electrode block Rxc are alternately arranged at intervals. The interdigitated fingers FI can make the extension trajectory of the gap between the first electrode block Txc and the second electrode block Rxc more tortuous. Without increasing the area of the first electrode block Txc and the second electrode block Rxc, the facing area can be increased, which is beneficial to increasing the capacitance between them and improving the sensitivity of the touch operation.

A capacitance can be formed between any adjacent first electrode block Txc and the second electrode block Rxc. When a finger performs a touch operation, the capacitance at the touch position can be changed. The touch position may be determined by sensing the first touch electrode Tx and the second touch electrode Rx corresponding to the amount of change in the capacitance, and the detailed principle will not be described herein in detail.

As shown in FIG. 2, the respective electrode blocks and the connecting portion Rxo mentioned above can be located on the same electrode layer, and the electrode layer can be formed simultaneously through a single patterning process. That is to say, the electrode layer TMB includes the first electrode block Txc and the second touch electrode Rx. In order to prevent the first touch electrode Tx and the second touch electrode Rx from being short-circuited, the transfer bridge BR can be located on one side of the electrode layer TMB. That is, the transfer bridge BR and the electrode layer TMB are in different layers. At the same time, an insulating layer IN is provided between the transfer bridge BR and the electrode layer TMB, thereby being separated. The first touch electrode Tx can cross with the second touch electrode Rx at the transfer bridge BR. Further, the transfer bridge BR can cross with the connecting portion Rxo. In addition, the transfer bridge BR may be connected to the first electrode block Txc through a via hole penetrating the insulating layer IN.

As shown in FIG. 2, in some embodiments of the present disclosure, the respective transfer bridges BRs can be provided on the surface of the encapsulation layer TFE away from the substrate SU, and can be formed at the same time. The respective transfer bridges BRs have the same thickness and the same material, and thus they can be formed simultaneously. The insulating layer IN can cover the respective transfer bridges BRs. The electrode layer TMB can be disposed on the surface of the insulating layer IN facing away from the substrate SU, and each transfer bridge BR can be connected to a first electrode block Txc through one or more via holes penetrating the insulating layer IN.

Both the transfer bridge BR and the electrode layer TMB can be single-layer or multi-layer conductive structures. For example, the transfer bridge BR can include two outer layers and an intermediate layer located between the two outer layers. The material of the outer layer can be titanium, and the material of the middle layer can be aluminum. That is, the transfer bridge BR has a Ti/Al/Ti structure. Alternatively, the material of the outer layer can be indium tin oxide (ITO), and the material of the middle layer can be aluminum. That is, the transfer bridge BR has an ITO/Ag/ITO structure. At the same time, if the electrode layer TMB has a multi-layer structure, it can also be a Ti/Al/Ti structure or an ITO/Ag/ITO structure.

The material of the insulating layer IN can be silicon nitride. Of course, it can also be other inorganic insulating materials or organic insulating materials such as silicon oxide, silicon nitride oxide, etc.

In addition, as shown in FIG. 2, in some embodiments of the present disclosure, the touch layer TSP may also include a buffer layer TBU and a protective layer TOC. The buffer layer TBU may serve as the base of the touch layer TSP. The buffer layer TBU may be disposed on the surface of the encapsulation layer TFE facing away from the substrate SU, and its material may include insulating materials such as silicon nitride and silicon oxide. The transfer bridge BR can be set on the surface of the buffer layer TBU facing away from the substrate SU. The protective layer TOC can cover the electrode layer TMB and the area of the insulating layer IN that is not covered by the electrode layer TMB. The protective layer TOC is configured to protect the electrode layer TMB, and its material can be a transparent insulating material such as polyimide (PI) or optical glue.

In order to reduce the obstruction of the light emitted by the display substrate PNL, the first touch electrode Tx and the second touch electrode Rx can both have a mesh structure formed by multiple grid lines. Each grid line can extend along a straight line, but the direction can be different.

In other embodiments of the present disclosure, the touch layer TSP may also adopt a self-capacitance structure. For example, the touch layer TSP may include a plurality of touch electrodes located on the same electrode layer TMB, and the touch electrodes are distributed in an array and spaced apart from each other. Each touch electrode and the ground form a self-capacitance. When the user's finger touches, the capacitance of the finger will be superimposed on the self-capacitance of the touch electrode, causing the capacitance to increase, so that the position of the touch point can be determined, that is, the position of the touch electrode corresponding to the touch point can be determined by detecting the change in capacitance of the touch electrode.

Figure 12:
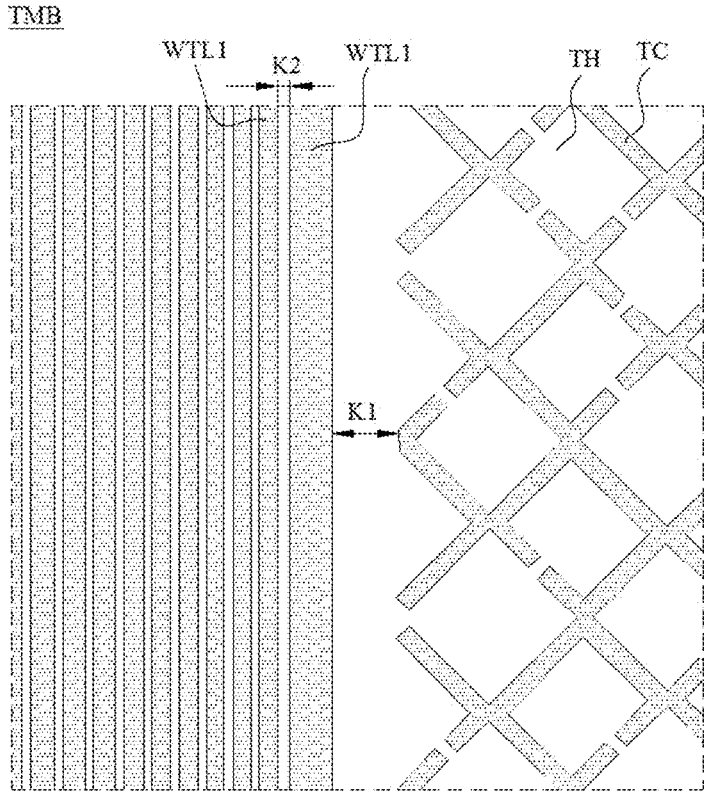
FIG. 12 is a partial enlarged view of an electrode layer of a touch display panel according to an embodiment of the present disclosure.

Further, in some embodiments of the present disclosure, as shown in FIG. 12, in order to improve the light transmittance, the electrode layer TMB in the above embodiments may be a mesh structure surrounded by channel lines TC, with multiple mesh holes TH. Each mesh hole TH is surrounded by multiple channel lines TC. The light-emitting device LD can correspond to the mesh TH, thereby reducing the light blocking by the electrode layer TMB. The shape of the mesh hole TH can be rhombus, rectangle, pentagon, hexagon and other polygons.

As shown in FIG. 5, the touch layer TSP may further include multiple peripheral touch lines WTL. The peripheral touch lines WTL may be located on the electrode layer TMB. A peripheral touch line WTL may be connected to a touch electrode. For example, A peripheral touch line WTL may be connected to the first touch electrode Tx or the second touch electrode Rx is connected in a mutual capacitive structure. Of course, A peripheral touch line WTL also may be connected to a touch electrode in a self-capacitive structure. At the same time, the peripheral touch line WTL can extend through the bending area BA into the lead-out area FA, and extend into the bonding area CA, and be connected to a driver chip. Of course, if there is no driver chip in the bonding area CA, it can also be connected to an external driver chip through the pins of the bonding area CA. The touch electrodes can receive/send touch signals through the peripheral touch lines WTL. For example, the first touch electrode Tx can be configured as a driving electrode for receiving the driving signal, and the second touch electrode Rx can be configured as a sensing electrode for outputting the sensing signal. Of course, the functions of the first touch electrode Tx and the second touch electrode Rx are interchangeable. Alternatively, the touch signal is received/sent through the touch electrode in a self-capacitive structure.

In some embodiments of the present disclosure, as shown in FIG. 5, the portion of the respective peripheral touch lines WTL located in the lead-out area FA can be divided into two touch lead-out parts WTS along the row direction X and a touch lead-out part WTS includes a part of the peripheral touch lines WTL located in the lead-out area FA. The two touch lead-out parts WTS may be arranged symmetrically with respect to a straight line extending along the column direction Y. A touch lead-out part WTS includes a lead-out section WTL1, a transition section WTL2 and a bonding section WTL3 distributed along the column direction Y. The transition section WTL2 can be connected between the lead-out section WTL1 and the bonding section WTL3, and the lead-out section WTL1 can be connected to the part of the peripheral touch line WTL outside the lead-out area FA. The bonding section WTL3 can extend to the bonding area CA and connected to the driver chip or pin in the bonding area CA. At the same time, the lead-out section WTL1 and the bonding section WTL3 both extend along the column direction Y, and the extending direction of the transition section WTL2 forms a certain angle with the column direction Y, so that it is different from the extending direction of the lead-out section WTL1 and the bonding section WTL3. In addition, the bonding section WTL3 of the two touch lead-out parts WTS is located between the two lead-out sections WTL1 in the row direction X.

As shown in FIG. 3, at least a part of the peripheral driving lines WBL located in the lead-out area FA can also be divided into two driving lead-out parts WBS along the row direction X. A driving lead-out part WBS includes a part of the peripheral driving lines WBL located in the lead-out area FA. The two touch lead-out parts WTS may be arranged symmetrically with respect to a straight line extending along the column direction Y. A driving lead-out part WBS includes a lead-out section WBL1, a transition section WBL2 and a bonding section WBL3 distributed along the column direction Y. The transition section WBL2 can be connected between the lead-out section WBL1 and the bonding section WBL3, and the lead-out section WBL1 can be connected to a part of the peripheral driving lines WBL outside the lead-out area FA. The bonding section WBL3 can be configured to be connected to the driver chip or pin in the bonding area CA. At the same time, the lead-out section WBL1 and the bonding section WBL3 both extend along the column direction Y, and the extending direction of the transition section WBL2 forms a certain angle with the column direction Y, so that it is different from the extending direction of the lead-out section WBL1 and the bonding section WBL3. In addition, the lead-out section WBL1 of the above-mentioned two driving lead-out parts WBS is located between the two bonding sections WBL3 in the row direction X. The above-mentioned peripheral driving lines WBL including the driving lead-out part WBS may include peripheral driving line WBL connected to the gate driving circuit, such as a clock signal line, a driving power supply line, a trigger signal line, etc., and of course, may also include peripheral driving line WBL connected to a light emitting control circuit.

The lead-out section WBL1 of the two driving lead-out parts WBS is located between the lead-out sections WTL1 of the two touch lead-out parts WTS, and the bonding section WTL3 of the two touch lead-out parts WTS is located between the bonding sections WBL3 of the two driving lead-out parts WBS. The transition section WBL2 of the two driving lead-out parts WBS and the transition section WTL2 of the two touch lead-out parts WTS are intersected in a one-to-one correspondence. That is, the orthographic projection of the transition section WBL2 of one driving lead-out part WBS on the substrate SU intersects with the orthographic projection of the transition section WTL2 of one touch lead-out part WTS on the substrate SU, and the angle between the extending directions of the intersecting transition sections WTL2 and WBL2 can be 90°, that is, the extending directions of the two are perpendicular, that is, orthogonal. Of course, the angle can also be other degrees.

The inventor found that signals of at least part of the peripheral driving lines WBL in the backplane BP will cause interference to the touch layer TSP, affect the normal operation of the touch function, and easily cause problems such as reduced touch accuracy. To this end, the inventor has proposed a variety of solutions to reduce the interference of the signal of the peripheral driving line WBL on the touch layer TSP.

Figure 6:
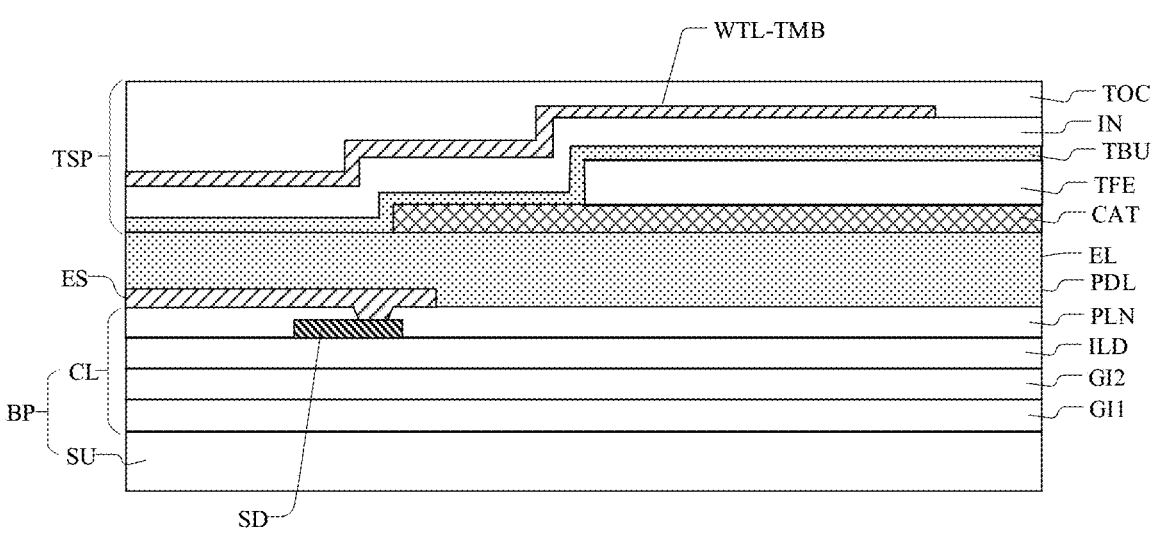
FIG. 6 is a partial cross-sectional view of a peripheral area of a touch display panel according to an embodiment of the present disclosure.

As shown in FIGS. 2 and 6, in some embodiments of the present disclosure, the respective light-emitting devices LD share the second electrode CAT, so that the second electrode CAT is a continuous whole-layer structure, and its boundary may be located in the peripheral area WA. There is an overlapping area between the second electrode CAT and a part of the peripheral driving lines WBL and the peripheral touch lines WTL, that is, the orthographic projections of the two on the substrate SU have an overlapping area. Since the second power supply signal VSS is a constant voltage signal, the second electrode CAT can serve as a shield between the driving backplane BP and the touch layer TSP, reducing the interference of the signal of the peripheral driving line WBL on the signal of the peripheral touch line WTL, and improving the accuracy of touch. At the same time, in order not to affect the bending of the lead-out area FA, the boundary of the second electrode CAT is located between the bending area BA and the display area AA, and has a certain distance from the bending area BA. In this way, for at least part of the peripheral touch lines WTL, a part of the peripheral touch lines WTL between the second electrode CAT and the bending area BA do not overlap with the second electrode CAT, so it is difficult to use the second electrode CAT to shield the signal of the driving backplane BP.

Figure 7:
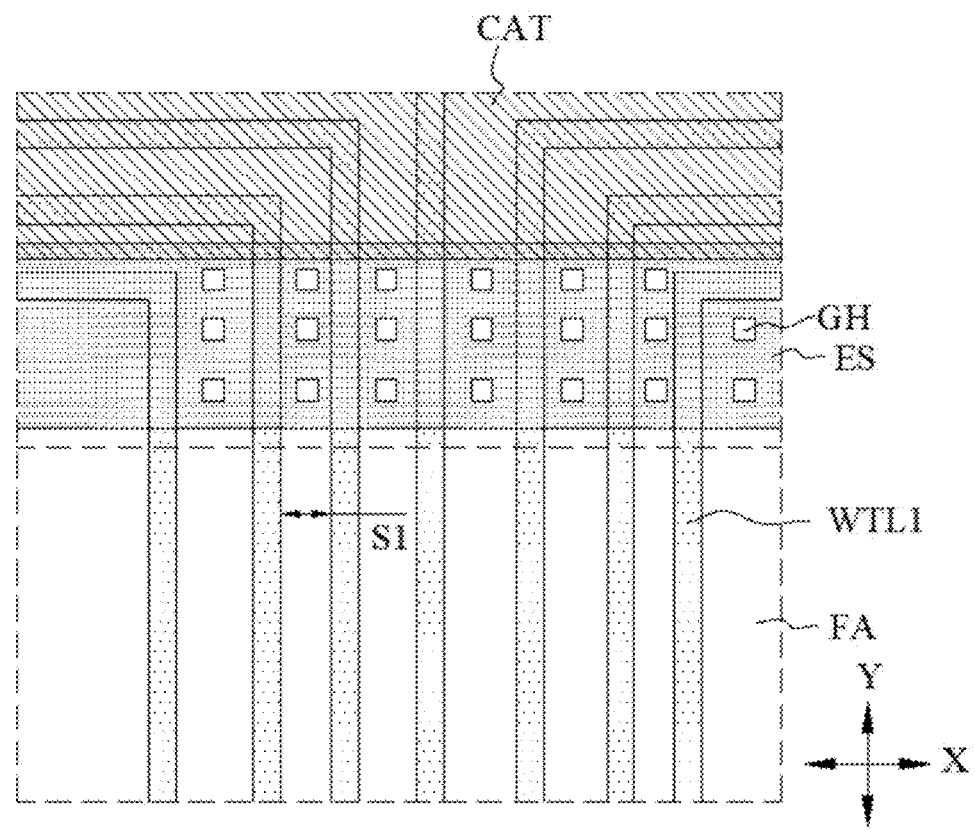
FIG. 7 is a partial top view of a peripheral area of a touch display panel according to an embodiment of the present disclosure.
Figure 8:
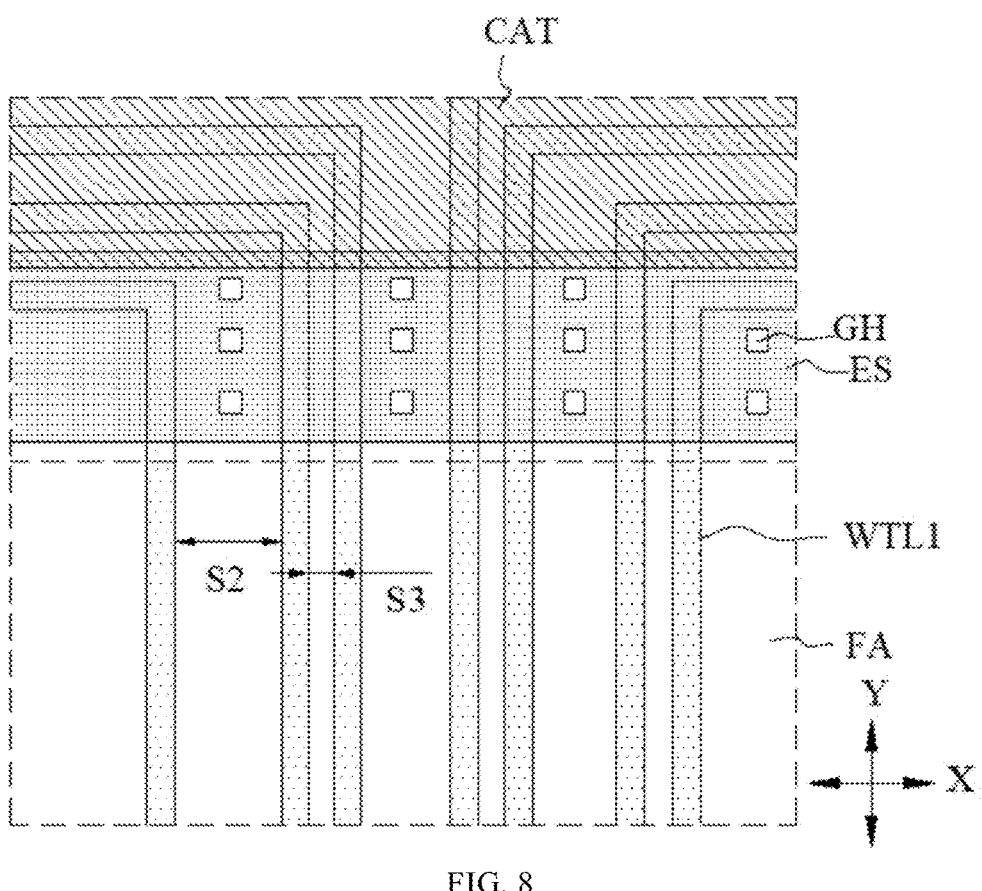
FIG. 8 is a partial top view of a peripheral area of a touch display panel according to another embodiment of the present disclosure.

Based on this, in some embodiments, as shown in FIGS. 6 to 8, a shielding layer ES can be provided between the driving backplane BP and the touch layer TSP. The shielding layer ES is located at a side of the bending area BA away from the display area AA. The shielding layer ES overlaps with the overlapping area of part of the peripheral touch lines WTL and the peripheral driving lines WBL, that is, covers the overlapping area. That is to say, the orthographic projections of the shielding layer ES, the peripheral touch lines WTL and the peripheral driving lines WBL on the substrate SU have overlapping areas. At the same time, the shielding layer ES also partially overlaps the second electrode CAT, and the shielding layer ES is partially located between the boundary of the second electrode CAT and the bending area BA. In addition, the length of the shielding layer ES in the row direction X is not less than the length of the bending area BA. Therefore, the space between the boundary of the second electrode CAT and the bending area BA can be shielded by the shielding layer ES, thereby shielding the peripheral touch lines WTL in the space. At the same time, the shielding layer ES can be connected to the first electrode ANO or the second electrode CAT in order to receive the constant voltage first power signal VDD or the second power signal VSS, thereby playing a shielding role. For example, since the shielding layer ES overlaps with the second electrode CAT, the two can be connected through a via hole in the overlapping area, so as to transmit the second power signal VSS to the shielding layer ES. Alternatively, the shielding layer ES can be connected to the second electrode CAT or the power supply line or power bus on the source-drain layer SD, so as to transmit the first power signal VDD to the shielding layer ES.

In addition, the pixel definition layer PDL can extend to a surface of the shielding layer ES away from the substrate and cover the shielding layer ES.

In order to simplify the structure, as shown in FIG. 6, in some embodiments of the present disclosure, the shielding layer ES and the second electrode CAT can be arranged on the same layer, so that the second electrode CAT and the shielding layer ES can be formed simultaneously through the same process. Further, the shielding layer ES and the second electrode CAT are provided on the surface of the planarization layer PLN away from the substrate SU. Since the planarization layer PLN is of an organic material, gas will be generated during the manufacturing process. Therefore, in order to facilitate exhaust and prevent the gas from causing the shielding layer ES to bulge, as shown in FIG. 7 and FIG. 8, exhaust holes GH can be provided in the shielding layer ES. The pixel definition layer PDL can fill the exhaust hole GH, and the buffer layer TBU and the insulating layer of the touch layer TSP can also extend to the side of the shielding layer ES away from the substrate.

Furthermore, the number of the exhaust holes GH is multiple, and they are arranged in multiple rows and columns along the row direction X and the column direction Y.

In order to prevent the exhaust hole GH from overlapping with the lead-out section WTL1 and affecting the shielding effect, the exhaust holes GH and the lead-out section WTL1 can be arranged in a staggered configuration. For example:

As shown in FIG. 8, in some embodiments of the present disclosure, at least two lead-out sections WTL1 are provided between two adjacent columns of exhaust holes GH, and there is no exhaust hole GH between two adjacent lead-out sections WTL1 between two adjacent columns of exhaust holes GH. Furthermore, the distance between two adjacent lead-out sections WTL1 between two adjacent columns of exhaust holes GH is smaller than the distance between two adjacent lead-out sections WTL1 located on both sides of one column of exhaust holes GH. For example, the distance between two adjacent lead-out sections WTL1 on both sides of one column of exhaust holes GH is S2, the distance between two adjacent lead-out sections WTL1 between two adjacent columns of exhaust holes GH is S3, S2 is greater than S3, and the width of one column of exhaust holes GH is not greater than 18-19 μm, for example 18.2 μm. The distance between two adjacent lead-out sections WTL1 between two adjacent columns of exhaust holes GH is 13-14 μm, for example 13.2 μm. That is to say, the respective lead-out sections WTL1 are not equally spaced. The exhaust hole GH may be located between two columns of lead-out sections WTL1 with a larger distance. No exhaust hole GH may be provided between two lead-out sections WTL1 with a smaller distance.

As shown in FIG. 7, in other embodiments of the present disclosure, at least part of the lead-out sections WTL1 and the respective columns of exhaust holes GH are alternately arranged along the row direction X. A lead-out section WTL1 can be provided between two adjacent columns of exhaust holes GH. A column of exhaust holes GH can be provided between two adjacent lead-out sections WTL1. Furthermore, the distance S1 between two adjacent lead-out sections WTL1 may be greater than the width of a column of exhaust holes GH, and the distance S1 may be 29 μm-30 μm, such as 29.2 μm.

Figure 13:
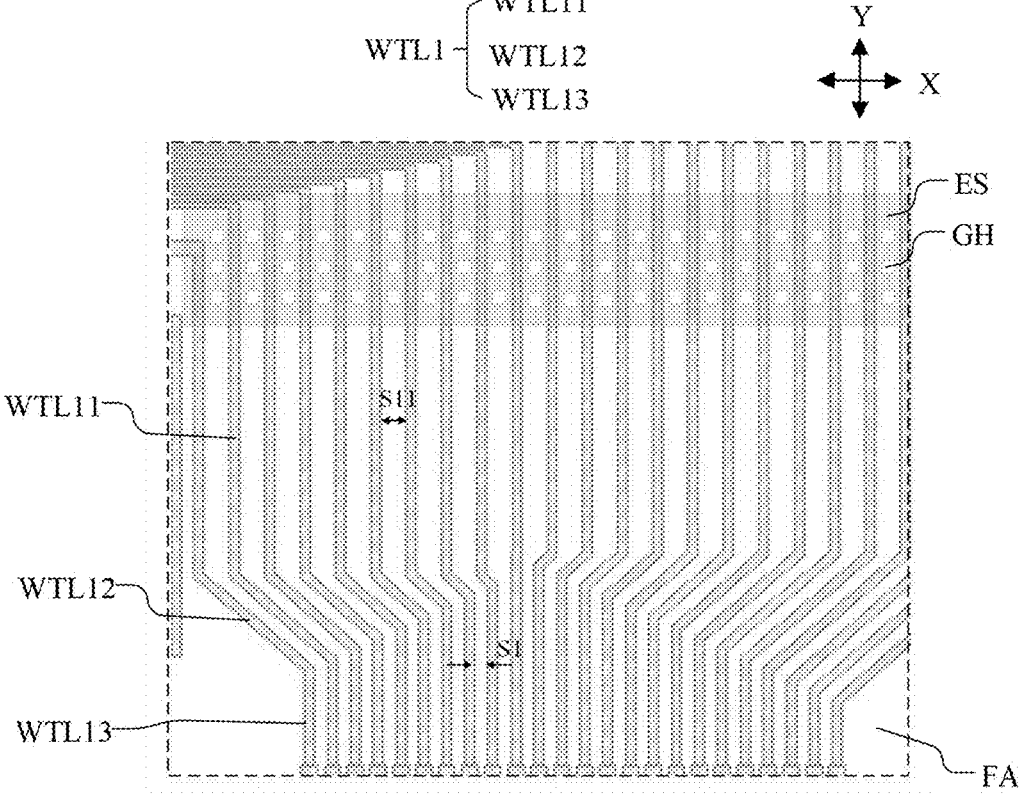
FIG. 13 is a partial cross-sectional view of a peripheral area of a touch display panel according to an embodiment of the present disclosure.

As shown in FIG. 13, in other embodiments of the present disclosure, at least part of the lead-out sections WTL1 may include a first sub-section WTL11, a second sub-section WTL12 and a third sub-section WTL13 distributed along the column direction Y. The first sub-section WTL11 can be connected to a part of the peripheral touch line WTL located outside the lead-out area FA. The third sub-section WTL13 is connected to the transition section WTL2, and the second sub-section WTL12 is connected between the first sub-section WTL11 and the third sub-section WTL13.

The distance between two adjacent third sub-sections WTL13 can be defined as the distance S1 between two adjacent lead-out sections WTL1. The distance S11 between two adjacent first sub-sections WTL11 is smaller than the distance S1 between two adjacent second sub-sections WTL12.

Figure 9:
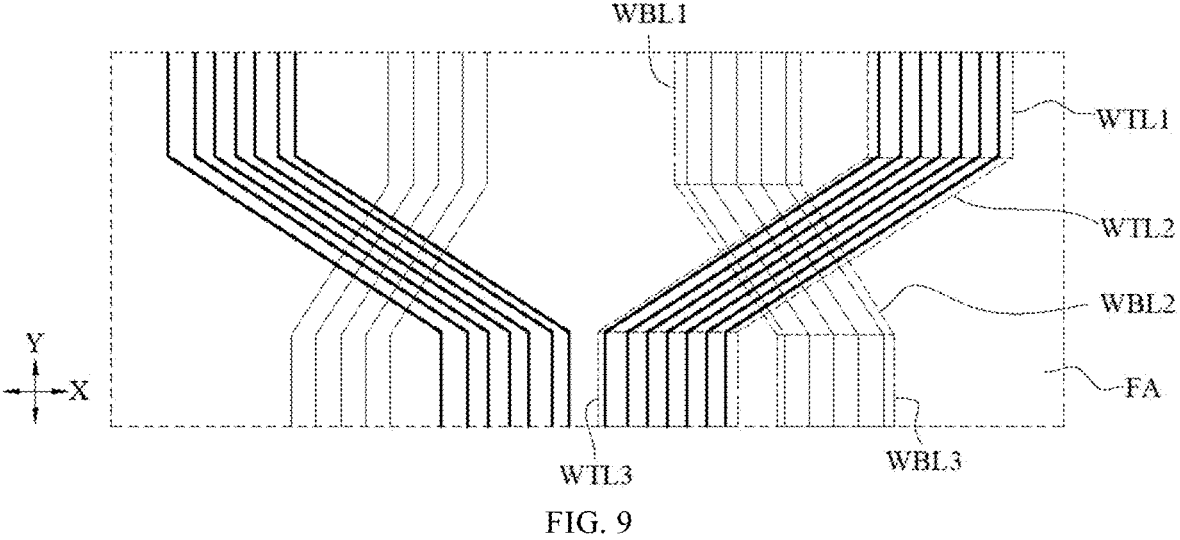
FIG. 9 is a partial top view of a lead-out area of a touch display panel according to an embodiment of the present disclosure.
Figure 10:
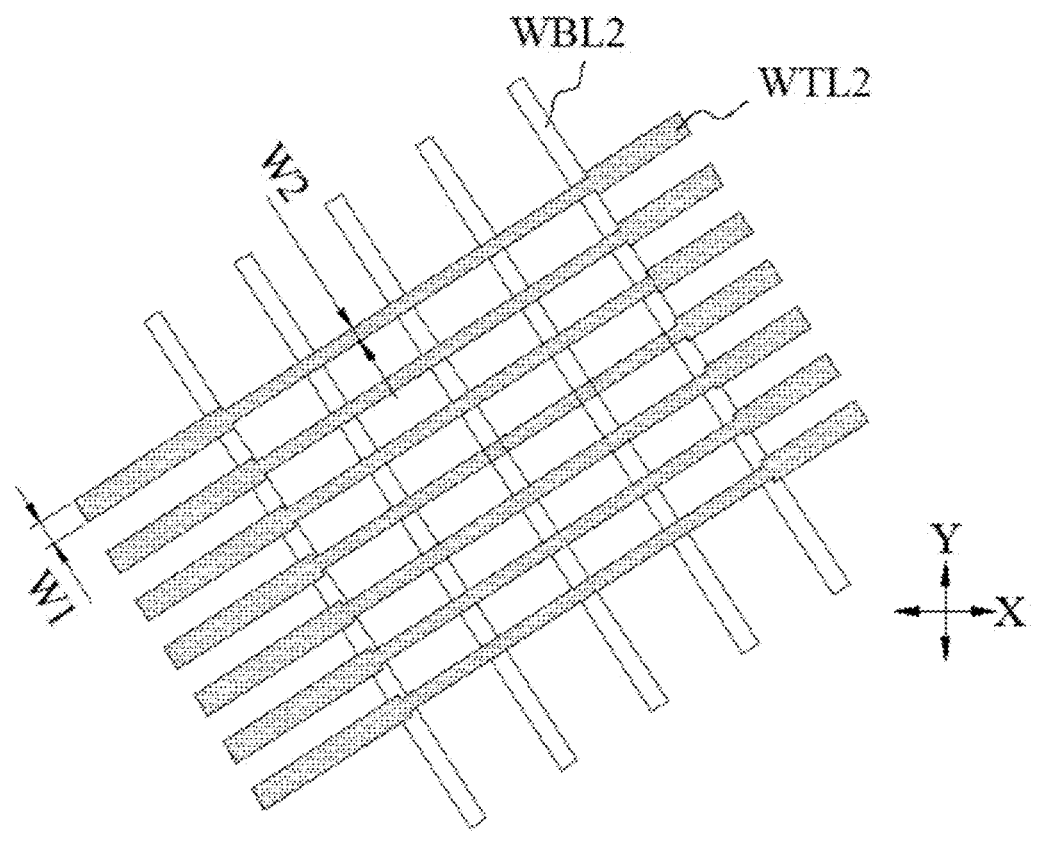
FIG. 10 is a schematic diagram of transition section intersection in a touch display panel according to an embodiment of the present disclosure.

As shown in FIGS. 9 and 10, for the intersecting transition sections WTL2 and WBL2 mentioned above, in order to prevent interference in the intersection area, the width of the transition section WTL2 can be set so that the width of the crossed area of the transition section WTL2 and the transition section WBL2 is smaller than the width of the uncrossed area, which can reduce parasitic capacitance and reduce the interference of the peripheral driving line WBL on the peripheral touch line WTL. That is to say, the width W2 of the area of the peripheral touch line WTL that intersects the peripheral driving line WBL can be made smaller than the width W1 of the area of the peripheral touch line WTL that does not intersect the peripheral driving line WBL.

For example, the difference between the width W1 of the area of the peripheral touch line WTL that does not intersect with the peripheral driving line WBL and the width W2 of the area of the peripheral touch line WTL that intersects the peripheral driving line WBL can be 4 μm-5 μm, such as 4.5 μm. Further, the width of the area of the peripheral touch line WTL that does not intersect with the peripheral driving line WBL is 16 μm-17 μm, such as 16.5 μm. The width of the area of the peripheral touch line WTL that intersects the peripheral driving line WBL and the peripheral driving line WBL is 11 μm-13 μm, such as 12 μm.

In addition, as shown in FIG. 5 and FIG. 12, the distance between the peripheral touch line WTL and the boundary of the touch electrode (the touch electrode of the self-capacitive structure or the first touch electrode Tx and the second touch electrode Rx of the mutual capacitive structure) closest to the peripheral touch line WTL can be limited to reduce mutual interference between the signals of the peripheral touch line WTL and the touch electrode. Specifically, the distance K1 between the peripheral touch line WTL closest to the touch electrode and the boundary of the touch electrode closest to the peripheral touch line WTL is made to be 20 times to 22 times of the distance K2 between any two adjacent peripheral touch lines WTL, for example:

In some embodiments of the present disclosure, the distance K2 between any two adjacent peripheral touch lines WTL may be 4.5 μm-5 μm, and the distance K1 between the peripheral touch line WTL and the boundary of the touch electrode closest to the peripheral touch line WTL is 90 μm-110 μm, such as 100 μm, so that the signals of the peripheral touch lines WTL and the signals of the touch electrodes do not interfere with each other.

As shown in FIG. 12, embodiments of the present disclosure also provide a touch display panel, which can be configured to reduce mutual interference between signals of peripheral touch lines WTL and signals of touch electrodes. The touch display panel may have a display area AA and a peripheral area WA located outside the display area. The peripheral area WA includes a bending area BA far away from the display area and a bonding area. The bonding area CA is located at a side of the bending area BA away from the display area. The touch display panel may include a touch layer TSP, which may include touch electrodes located in the display area AA and peripheral touch lines WTL located in the peripheral area WA, and the peripheral touch lines WTL pass through the bending area BA, extending into the bonding area CA. The distance K1 between the peripheral touch line WTL closest to the touch electrode and the boundary of the touch electrode closest to the peripheral touch line WTL is 20 times to 22 times of the distance K2 between any two adjacent peripheral touch lines WTL.

As shown in FIG. 12, in some embodiments of the present disclosure, the above solutions such as the shielding layer ES, the exhaust hole GH, and the intersection of the peripheral touch line WTL and the peripheral driving line WBL may not be used, and only the distance K2 between any two adjacent peripheral touch lines WTL can be 4.5 μm-5 μm, and the distance K1 between the peripheral touch line WTL and the boundary of the touch electrode closest to the peripheral touch line WTL is 90 μm-110 μm, for example 100 μm, so that the signals of the peripheral touch line WTL and signals of the touch electrode will not interfere with each other.

Of course, in other embodiments of the present disclosure, the above solutions such as the shielding layer ES and the exhaust hole GH can also be used. For details, please refer to the touch display panel of the above embodiments, which will not be repeated here.

Embodiments of the present disclosure also provide a touch display panel that can reduce the parasitic capacitance and the impact of the peripheral driving lines WBL on the peripheral touch lines WTL without adopting the shielding layer ES, exhaust hole GH and other solutions mentioned above by making the width of the area where the transition section WTL2 and the transition section WBL2 intersect smaller than that of the non-intersecting area. Specifically, at least part of the peripheral touch lines WTL and at least part of the peripheral driving lines WBL intersect between the bending area BA and the bonding area CA, and the width of the area of the peripheral touch lines WTL that intersects with the peripheral driving lines WBL is smaller than the width of the area of the peripheral touch lines WTL that does not intersect with the peripheral driving line WBL.

Furthermore, the difference between the width of the area of the peripheral touch line WTL that does not intersect with the peripheral driving line WBL and the width of the area of the peripheral touch line WTL that intersects with the peripheral driving line is 4 μm-5 μm. The extending directions of the peripheral touch lines WTL and the peripheral driving lines WBL that intersect with each other are perpendicular. The specific content has been described in the above embodiments, and reference may be made to the touch display panel in the above embodiments, which will not be repeated here.

The present disclosure also provides a display device, which may include the touch display panel of any of the above embodiments. The touch display panel is a touch display panel according to any of the above embodiments. For its specific structure and beneficial effects, reference can be made to the above embodiments of the display panel and will not be repeated here. The display device of the present disclosure may be a mobile phone, a smart watch, a smart bracelet, a tablet computer, a television, and other electronic devices with a display function, which are not listed here.

Other embodiments of the disclosure will be readily apparent to those skilled in the art from consideration of the specification and practice of the present disclosure herein. This application is intended to cover any variations, uses, or adaptations of the disclosure that follow the general principles of the disclosure and include common knowledge or customary technical means in the technical field that are not disclosed in the disclosure. It is intended that the specification and examples be considered as exemplary only, with a true scope and spirit of the disclosure being indicated by the following claims.

What is claimed is:

1. A touch display panel, having a display area and a peripheral area located outside the display area, wherein the peripheral area comprises a bending area and a bonding area away from the display area, and the bonding area is located on a side of the bending area away from the display area;
   wherein the touch display panel comprises:
   a driving backplane comprising peripheral driving lines at least partially located in the peripheral area, wherein at least part of the peripheral driving lines passes through the bending area and extends into the bonding area;
   a plurality of light-emitting devices provided on a side of the driving backplane and located in the display area, wherein each of light-emitting devices comprises a first electrode, a light-emitting layer and a second electrode sequentially stacked in a direction away from the driving backplane, and a boundary of the second electrode extends to the peripheral area and is located on a side of the bending area away from the bonding area;
   a touch layer provided on a side of a light-emitting device layer away from the driving backplane, and comprising peripheral touch lines located in the peripheral area, wherein the peripheral touch lines pass through the bending area, and extend into the bonding area, and at least part of the peripheral touch lines and at least part of the peripheral driving lines have an overlapping area; and
   a shielding layer provided between the touch layer and the driving backplane, and at least partially located between the boundary of the second electrode and the bending area, wherein the shielding layer at least partially covers the overlapping area, and the shielding layer receives a same signal as the first electrode or the second electrode.

2. The touch display panel according to claim 1, wherein the shielding layer and the first electrode are arranged in a same layer.

3. The touch display panel according to claim 2, wherein the driving backplane comprises:
   a substrate;
   a circuit layer provided on a side of the substrate and comprising at least part of the peripheral driving lines;
   a planarization layer covering the circuit layer;
   wherein the shielding layer and the first electrode are provided on a surface of the planarization layer away from the substrate, and the shielding layer is provided with an exhaust hole.

4. The touch display panel according to claim 3, wherein there are a plurality of exhaust holes and the plurality of exhaust holes are arranged in a plurality of rows and columns along a row direction and a column direction.

5. The touch display panel according to claim 4, wherein the peripheral touch lines respectively comprise lead-out sections extending to the bonding area along the column direction, and the lead-out sections are distributed at intervals in the row direction, and all overlap with the shielding layer; and
   at least two lead-out sections are provided between two adjacent columns of exhaust holes.

6. The touch display panel according to claim 5, wherein a distance between two adjacent lead-out sections between two adjacent columns of the exhaust holes is smaller than a distance between two adjacent lead-out sections located on both sides of one column of exhaust holes.

7. The touch display panel according to claim 4, wherein the peripheral touch lines respectively comprise lead-out sections extending to the bonding area along the column direction, and the lead-out sections are distributed at intervals in the row direction, and all overlap with the shielding layer; and at least part of the lead-out sections and columns of the exhaust holes are alternately arranged along the row direction.

8. The touch display panel according to claim 7, wherein a distance between two adjacent lead-out sections is greater than a width of one column of the exhaust holes.

9. The touch display panel according to claim 1, wherein at least part of the peripheral touch lines and at least part of the peripheral driving lines intersect between the bending area and the bonding areas, and a width of an area of the peripheral touch lines that intersects with the peripheral driving lines is smaller than a width of an area of the peripheral touch lines that does not intersect with the peripheral driving lines.

10. The touch display panel according to claim 9, wherein a difference between the width of the area of the peripheral touch lines that does not intersect with the peripheral driving lines and the width of the area of the peripheral touch lines that intersects with the peripheral driving lines is 4 μm-5 μm.

11. The touch display panel according to claim 9, wherein extending directions of the peripheral touch lines and the peripheral driving lines that intersect with each other are perpendicular.

12. The touch display panel according to claim 3, wherein the circuit layer comprises a power bus located in the peripheral area and a plurality of pixel circuits and power supply lines located in the display area, and one of the power supply lines is connected to one column of the pixel circuits, and the power supply lines are connected to the power bus; the shielding layer is connected to the power bus or the power supply lines.

13. The touch display panel according to claim 12, wherein the circuit layer comprises a semiconductor layer, a first gate insulating layer, a first gate layer, a second gate insulating layer, a second gate layer, a dielectric layer and a source-drain layer sequentially stacked in a direction away from the substrate, the planarization layer is provided on a side of the source-drain layer away from the substrate; the power supply lines and the power bus are located on the source-drain layer, the peripheral driving lines are located on at least one layer of the first gate layer, the second gate layer and the source-drain layer.

14. The touch display panel according to claim 1, wherein the touch layer further comprises touch electrodes located in the display area, and the touch electrodes and the peripheral touch lines are arranged on a same layer; a distance between a peripheral touch line closest to the touch electrodes and a boundary of the touch electrodes closest to the peripheral touch lines is 20 times to 22 times of a distance between any two adjacent peripheral touch lines.

15. The touch display panel according to claim 14, wherein the touch electrodes comprise a plurality of first touch electrodes and a plurality of second touch electrodes, the plurality of the first touch electrodes are spaced apart along a row direction, one of the first touch electrodes comprises a plurality of first electrode blocks spaced apart along a column direction and transfer bridges connecting two adjacent first electrode blocks; the plurality of the second touch electrodes are spaced apart along the column direction, one of the second touch electrodes comprises a plurality of second electrode blocks connected in series along the row direction; one of the transfer bridges and one of the second touch electrodes are arranged crosswise; the first electrode blocks, the second electrode blocks and the peripheral touch lines are located on a same electrode layer, and one of the peripheral touch lines is connected to one of the first touch electrodes or the second touch electrodes; the transfer bridges are located on a side of the electrode layer, and an insulating layer is provided between the transfer bridges and the electrode layer.

16. A touch display panel, having a display area and a peripheral area located outside the display area, wherein the peripheral area comprises a bending area and a bonding area away from the display area, and the bonding area is located on a side of the bending area away from the display area;

wherein the touch display panel comprises:

a touch layer comprising touch electrodes located in the display area and peripheral touch lines located in the peripheral area, wherein the peripheral touch lines pass through the bending area and extend into the bonding area;

wherein a distance between a peripheral touch line closest to the touch electrodes and a boundary of the touch electrodes closest to the peripheral touch lines is 20 times to 22 times of a distance between any two adjacent peripheral touch lines.

17. A touch display panel, having a display area and a peripheral area located outside the display area, wherein the peripheral area comprises a bending area and a bonding area away from the display area, and the bonding area is located on a side of the bending area away from the display area;

wherein the touch display panel comprises:

a driving backplane, comprising peripheral driving lines at least partially located in the peripheral area, wherein at least part of the peripheral driving lines passes through the bending area and extends into the bonding area;

a plurality of light-emitting devices provided on a side of the driving backplane and located in the display area, wherein each of the light-emitting devices comprises a first electrode, a light-emitting layer and a second electrode sequentially stacked in a direction away from the driving backplane; a boundary of the second electrode extends to the peripheral area and is located on a side of the bending area away from the bonding area;

a touch layer provided on a side of a light-emitting device layer away from the driving backplane, and comprising peripheral touch lines located in the peripheral area, wherein the peripheral touch lines pass through the bending area, extend into the bonding area, and at least part of the peripheral touch lines overlaps with at least part of the peripheral driving lines;

at least part of the peripheral touch lines and at least part of the peripheral driving lines intersect between the bending area and the bonding area, and a width of an area of the peripheral touch lines that intersects with the peripheral driving lines is smaller than a width of an area of the peripheral touch lines that does not intersect with the peripheral driving lines.

18. The touch display panel according to claim 17, wherein a difference between the width of the area of the peripheral touch lines that does not intersect with the peripheral driving lines and the width of the area of the peripheral touch lines that intersects with the peripheral driving lines is 4 μm-5 μm.

19. The touch display panel according to claim 17, wherein extending directions of the peripheral touch lines and the peripheral driving lines that intersect with each other are perpendicular.

20. A display device, comprising the touch display panel according to claim 1.

* * * * *